(12) United States Patent
Gualtieri

(10) Patent No.: US 7,373,272 B2
(45) Date of Patent: May 13, 2008

(54) TEMPERATURE COMPENSATED RESONANT TRANSMISSION LINE SENSOR

(75) Inventor: Devlin M. Gualtieri, Ledgewood, NJ (US)

(73) Assignee: Honeywell International, Inc., Morristown, NJ (US)

( * ) Notice: Subject to any disclaimer, the term of this patent is extended or adjusted under 35 U.S.C. 154(b) by 107 days.

(21) Appl. No.: 11/494,373

(22) Filed: Jul. 26, 2006

(65) Prior Publication Data

US 2008/0024119 A1    Jan. 31, 2008

(51) Int. Cl.
*G01C 9/00* (2006.01)
(52) U.S. Cl. ...................... 702/150; 324/633
(58) Field of Classification Search ................. 702/150
See application file for complete search history.

(56) References Cited

U.S. PATENT DOCUMENTS

| | | | |
|---|---|---|---|
| 3,389,332 A | 6/1968 | Ketcham | |
| 3,566,869 A | 3/1971 | Crowson | |
| 4,135,132 A | 1/1979 | Tafjord | |
| 4,208,640 A | 6/1980 | van der Meijs | |
| 4,507,546 A | 3/1985 | Fortune et al. | |
| 4,704,573 A | 11/1987 | Turner, Jr. | |
| 4,733,798 A | 3/1988 | Brady et al. | |
| 4,780,661 A | 10/1988 | Bolomey et al. | |
| 4,795,886 A | 1/1989 | Carter, Jr. | |
| 5,103,181 A | 4/1992 | Gaisford et al. | |
| 5,332,981 A | 7/1994 | Mazzochette et al. | |
| 5,352,868 A | 10/1994 | Denen et al. | |
| 5,609,059 A | 3/1997 | McEwan | |
| 5,659,253 A | 8/1997 | Busking | |
| 5,742,202 A | 4/1998 | Vogt | |
| 5,772,153 A | 6/1998 | Abaunza et al. | |
| 6,225,812 B1 | 5/2001 | Mays et al. | |
| 6,361,207 B1 | 3/2002 | Ferguson | |
| 6,505,509 B2 | 1/2003 | Gualtieri | |
| 7,092,840 B2 * | 8/2006 | Gualtieri | ...................... 702/150 |

\* cited by examiner

*Primary Examiner*—John Barlow
*Assistant Examiner*—Stephen J. Cherry
(74) *Attorney, Agent, or Firm*—Ingrassia Fisher & Lorenz

(57) ABSTRACT

A position sensing system uses a resonant transmission line having a moveable dielectric as a position sensor. The system includes circuitry that supplies an RF drive signal to the resonant transmission line, which reflects the drive signal. Based on a standing wave signal, which is generated from the drive signal and the reflected drive signal, the circuitry determines the frequency of the RF sensor drive signal relative to a resonant frequency of the resonant transmission line, and adjusts the RF sensor drive signal frequency to match a resonant frequency of the transmission line. The system additionally includes integral circuitry that senses the temperature of the resonant transmission line and supplies a temperature signal representative thereof. The circuitry determines the relative position of the moveable dielectric based on the adjusted RF sensor drive signal frequency, and supplies a temperature compensated position signal representative thereof.

22 Claims, 8 Drawing Sheets

TEMPERATURE COMPENSATED RESONANT TRANSMISSION LINE SENSOR

TECHNINCAL FIELD

The present invention relates to sensors and, more particularly, to a resonant transmission line sensor that can sense both position and temperature, and thereby supply a temperature-compensated position signal.

BACKGROUND

Various systems include components, such as valves, that may be automatically moved to one or more positions, under the control of one or more other system components, during system operation. These components may be moved periodically or in response to certain conditions that may occur within the system. In either case, it is preferable to know that the component being moved has actually been, or is being, moved from its initial position to its desired position. It is also preferable to know that the component remains in the desired position once it has been moved. Thus, numerous systems and methods have been developed to sense, and supply signals representative of, the position of various moveable components.

Some examples of position sensors that have been developed include potentiometers, rotary variable differential transformers (RVDTs), linear variable differential transformers (LVDTs), capacitance position sensors, and Hall effect sensors, just to name a few. Although these, and other, known types of position sensors are generally reliable, each suffers certain drawbacks. Most notably, when many of the known position sensors are used in a relatively high temperature environment (e.g., 950° F. or more), the accuracy of the position sensor may deteriorate.

One example of a system in which a position sensor may be exposed to relatively high temperatures is an aircraft gas turbine engine. Gas turbine engines include various components, such as valves, that may be exposed to such high temperatures. Proper engine operation may, in many instances, rely on knowing the position of these components. However, if the accuracy of the position sensor suffers at high temperatures, the engine may not operate properly and/or most efficiently. Various systems and methods have been developed to compensate sensor inaccuracies for temperature. However, these systems and methods can be complex and relatively costly to implement.

Hence, there is a need for a position sensing system that can accurately determine, and provide a signal representative of, the position of one or more components in a relatively high temperature environment, that is relatively easy and less costly to implement. The present invention addresses one or more of these needs.

BRIEF SUMMARY

The present invention provides a position sensing system that can accurately determine, and provide a signal representative of, the position of one or more components in a relatively high temperature environment.

In one embodiment, and by way of example only, a position sensing system includes a variable frequency signal source, a transmission line sensor, and a summing and temperature sense circuit. The variable frequency signal source is coupled to receive a frequency control signal and is operable, in response thereto, to supply a radio frequency (RF) sensor drive signal at a frequency. The transmission line sensor has one or more resonant frequencies, and includes a sensor conductor and a moveable dielectric at least partially surrounding the sensor conductor. The sensor conductor has a driven end coupled to receive the RF sensor drive signal and a terminal end configured to reflect the RF sensor drive signal to thereby supply a reflected signal to the driven end. The moveable dielectric is configured to receive a drive force and, upon receipt thereof, to move the dielectric to a position and thereby vary the one or more resonant frequencies of the transmission sensor. The summing and temperature sense circuit includes one or more circuit elements having an electrical characteristic that varies with temperature. The summing and temperature sense circuit is coupled to receive the RF sensor drive signal and the reflected signal and is operable, in response thereto, to supply a standing wave signal having an amplitude that varies with the one or more resonant frequencies of the transmission line sensor. The summing and temperature sense circuit is further coupled to receive a direct current (DC) sensor excitation signal and is operable, in response thereto, to supply a temperature signal representative of transmission line sensor temperature.

Other independent features and advantages of the preferred temperature compensated position sensor system will become apparent from the following detailed description, taken in conjunction with the accompanying drawings which illustrate, by way of example, the principles of the invention.

DETAILED DESCRIPTION OF PREFERRED EMBODIMENTS

Before proceeding with a detailed description, it is to be appreciated that the described embodiment is not limited to use in conjunction with a particular type of valve, or even to use in a valve. Thus, although the present embodiment is, for convenience of explanation, depicted and described as being used to determine the position of a valve, it will be appreciated that it can be implemented to determine the position of various other components, and in various other systems and environments.

Figure 1:
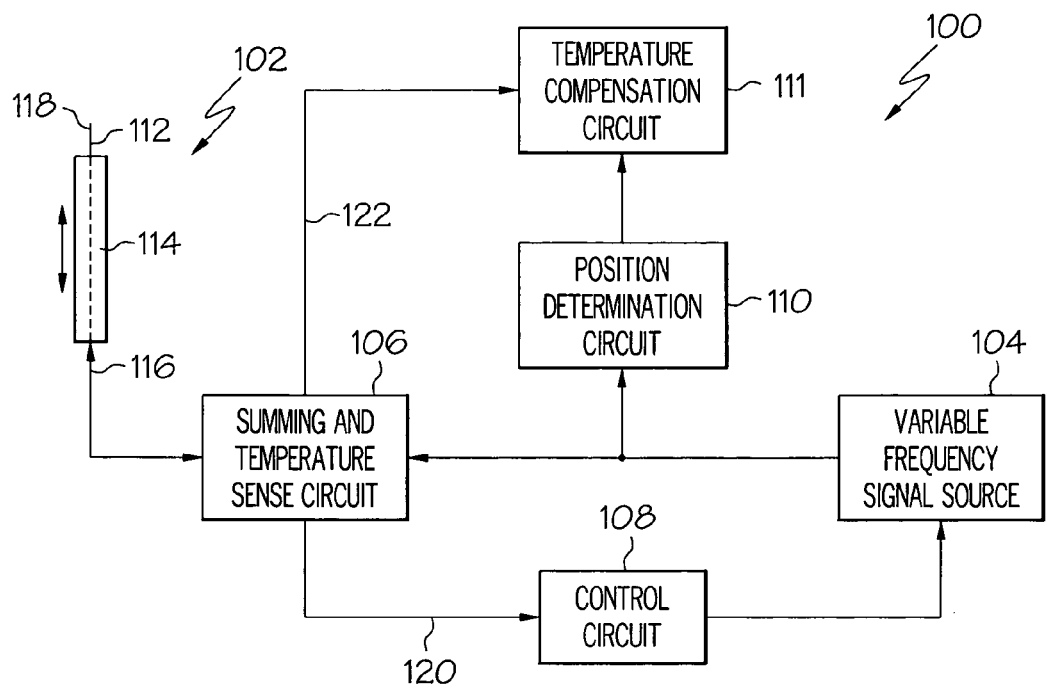
FIG. 1 is a functional schematic block diagram of a position sensor system according to an exemplary embodiment of the present invention.

Turning now to the description, and with reference first to FIG. 1, a functional schematic block diagram of a position sensor system is shown. The system 100 includes a sensor 102, a variable frequency signal source 104, a summing and temperature sense circuit 106, a control circuit 108, a position determination circuit 110, and a temperature compensation circuit 111. The sensor 102 is a resonant transmission line that includes a conductor 112, and a moveable dielectric 114 that at least partially surrounds the conductor 112. The sensor 102 may be any one of numerous types of resonant transmission lines including, for example, coaxial transmission line, twin lead transmission lines, and stripline transmission lines. However, in a particular preferred embodiment, the sensor 102 is an embedded stripline, having a driven end 116 and a terminal end 118. As will be described more fully below, the conductor driven end 116 is coupled to receive a sensor drive signal from the variable frequency source 104, and the conductor terminal end 118 reflects the sensor drive signal back toward the driven end 116, producing a standing wave signal voltage at the driven end 116. A schematic representation of an embedded stripline transmission line 200 is shown in FIG. 2, and will now be described in more detail.

Figure 2:
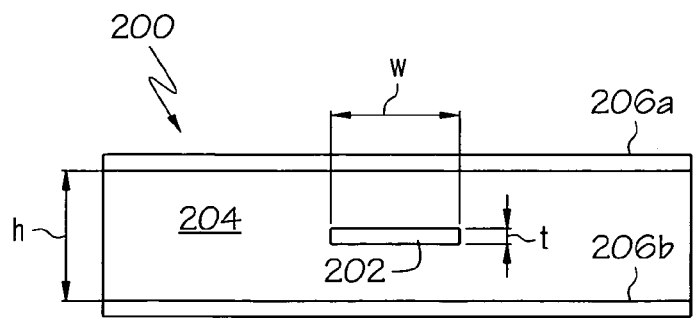
FIG. 2 is a schematic representation of an exemplary embedded stripline transmission line.

An embedded stripline 200 is a resonant transmission line that includes a conductor 202, a dielectric 204, and a pair of ground planes 206a, 206b. The conductor 202 is embedded in, or otherwise surrounded by, the dielectric 204. The dielectric 204 in turn is disposed between the ground planes 206a, 206b, which shield the conductor 202 from stray signals. As is generally known, the characteristic impedance ($Z_o$) of an embedded stripline is approximated by the following equation:

$$Z_o = 60(\epsilon)^{-1/2} \ln[(4h/(0.67\pi w(0.8+t/w))], \quad (Eq. 1)$$

where ($\epsilon$) is the dielectric constant, and the remaining parameters are as shown in FIG. 2. When the thickness (t) of the conductor 202 is sufficiently small, Equation 1 can be simplified to the following:

$$Z_o = 60(\epsilon)^{-1/2} \ln[2.38(h/w)]. \quad (Eq. 2)$$

Figure 3:
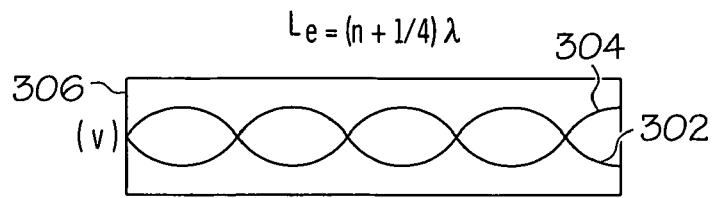
FIG. 3 is a simplified schematic representation of an exemplary resonant transmission line showing incident and reflected waves when the electrical length of the transmission line is an (n+¼)-multiple of the wavelength of the incident wave.
Figure 4:
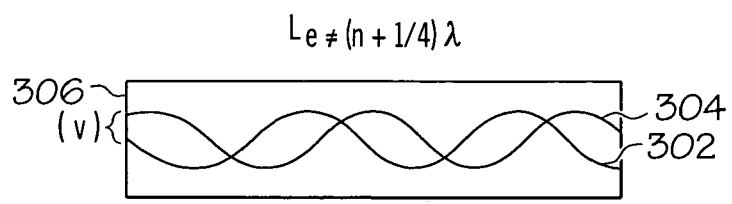
FIG. 4 is a simplified schematic representation of an exemplary resonant transmission line showing incident and reflected waves when the electrical length of the transmission line is not an (n+¼)-multiple of the wavelength of the incident wave.

As is also generally known, whenever a transmission line, such as the embedded stripline 200 described above, is terminated in an impedance that does not match the characteristic impedance ($Z_o$) of the transmission line, the transmission line will reflect an incident signal injected into it. If the incident signal is a continuous signal, such as a radio frequency (RF) signal, the incident and reflected signals mix, producing what is known as a standing wave signal. As shown in FIG. 3, and as is generally known, when the electrical length ($L_e$) of the transmission line 200 is an (n+¼) multiple of the wavelength ($\lambda$) of the incident signal, the incident 302 and reflected 304 signals destructively interfere at the driven end 306 of the transmission line 200, and the standing wave signal voltage (V) is substantially zero at the driven end 306. Conversely, as shown in FIG. 4, whenever the electrical length ($L_e$) varies from an (n+¼) wavelength multiple, the incident 302 and reflected 304 signals do not fully destructively interfere, and a non-zero standing wave signal voltage (V) is present at the driven end 306. When the former situation exists, that is the electrical length ($L_e$) of the transmission line 200 is an (n+¼) multiple of the wavelength ($\lambda$) of the incident signal, the frequency of the incident signal matches the resonant frequency of the transmission line.

Figure 5:
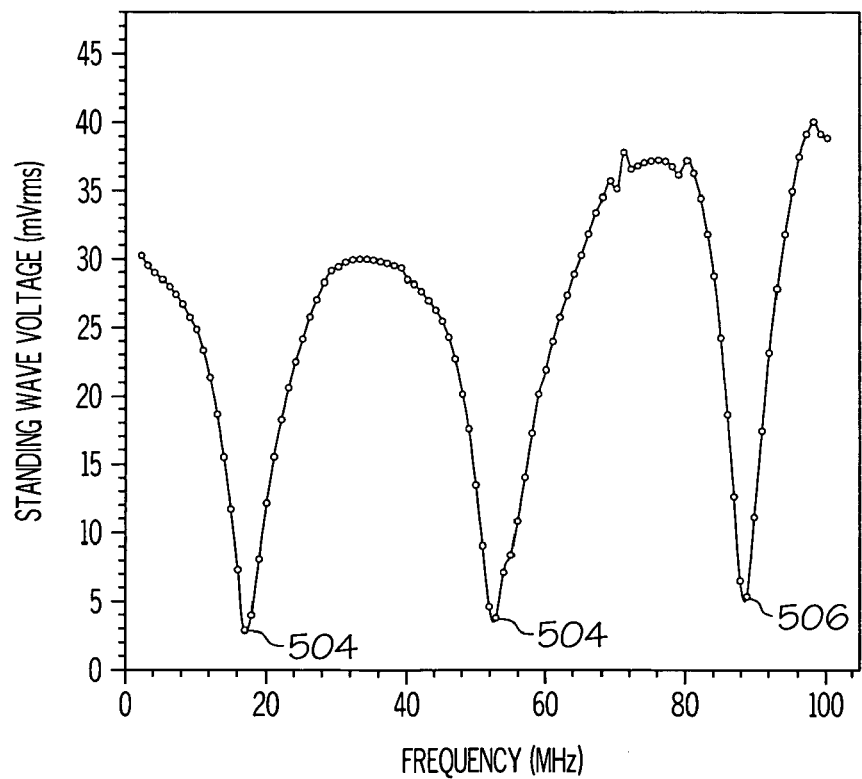
FIG. 5 is graph depicting an exemplary resonant transmission line standing wave response in the frequency domain.

The standing wave signal voltage (V) versus transmission line electrical length ($L_e$) is known as the standing wave response of a transmission line. The standing wave response may be depicted in either the time domain, such as shown in FIGS. 3 and 4, or in the frequency domain. An exemplary depiction of a transmission line standing wave response in the frequency domain is illustrated in FIG. 5, and shows nodes 502, 504, 506 occurring at the resonant frequencies of the transmission line. The first of these so-called node frequencies 502 coincides with the principle resonant frequency of the transmission line, whereas the subsequent nodes coincide with multiples of the transmission line resonant frequency.

Figure 6:
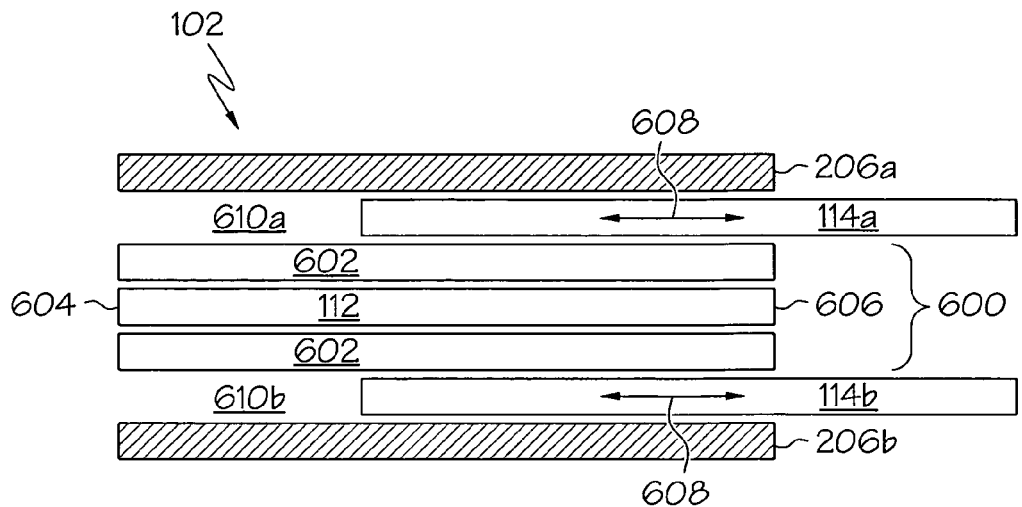
FIG. 6 is a simplified schematic representation an exemplary physical implementation of an embedded stripline resonant transmission line sensor that may be used with the system of FIG. 1.

From the foregoing it is seen that if the dielectric constant ($\epsilon$) of a transmission line is varied by, for example, including a moveable dielectric 204 in the stripline 200, the impedance (Z) of the stripline 200 and the speed of light, or signal propagation speed, in the stripline 200, and thus the electrical length ($L_e$) and resonant frequency of the stripline 200 will vary accordingly. Hence, the stripline 200 constructed with a moveable dielectric 204 can be used as a sensor. A simplified schematic representation of the construction of a physical implementation of an embedded stripline resonant transmission line sensor, which is preferably used as the sensor 102 in the system 100 depicted in FIG. 1, is illustrated in FIG. 6, and will now be described in more detail.

The sensor 102 includes an embedded stripline module 600, and the previously mentioned moveable dielectric 114. The stripline module 600 includes the conductor 112, which is embedded in a fixed dielectric 602. It will be appreciated that the sensor 102 could be implemented without the fixed dielectric 602, but is preferably included to ease in the construction and operation of the sensor 102. The moveable dielectric 114, at least in the depicted embodiment, is implemented as two separate moveable dielectrics 114a, 114b, disposed on either side of the stripline module 600, though it will be appreciated that it could be implemented as a single moveable dielectric on either side of the stripline module 600. The sensor 102 additionally includes the previously described ground planes 206a, 206b to shield the conductor 112 from stray signals. As indicated by the arrows 608 in FIG. 6, the moveable dielectrics 114a, 114b, upon receipt of a drive force, move into and out of spaces 610a, 610b between the stripline module 600 and the ground planes 206a, 206b, thereby varying the impedance (Z) and signal propagation speed, and thus the resonant frequency, of the sensor 102.

It will be appreciated that the material selected as the dielectric, for both the moveable 114a, 114b and fixed 602 dielectrics, may be any one of numerous dielectric materials. Preferably, the dielectric material will have a dielectric constant that is sufficiently greater than air, so that the transmission line sensor 102 exhibits the desired reflection characteristics to an injected signal (i.e., sufficient reduction is speed of light in the transmission line). In addition, the selected material should be stable at the operating temperature of the environment in which it will be placed during operation. Examples of dielectric materials that could be used include, without limitation, glass, quartz, mica, nylon, polyethylene, and mylar. In a particular preferred embodiment, however, the dielectric material is alumina. Reference should now be returned to FIG. 1, while the description of the remaining portions of the sensor system 100 is provided.

The variable frequency source 104 is configured to generate and supply a radio frequency (RF) sensor drive signal. The particular frequency at which the variable frequency source 104 supplies the RF sensor drive signal, is based on a control signal supplied from the control circuit 108. As will be described in more detail further below, the control supplied from the control circuit 108, and thus the particular RF frequency at which the variable frequency source 104 generates and supplies the RF sensor drive signal, depends on the impedance of, and signal propagation in, the transmission line sensor 102. In particular, the RF sensor drive signal frequency supplied by the variable frequency source 104 preferably matches the resonant frequency of the transmission line sensor 102. The variable frequency source 104 may be configured to generate and supply the sensor drive signal in any one of the numerous RF frequency bands (e.g., VLF, LF, MF, HF, etc). Preferably, however, the variable frequency source 104 is configured to generate the sensor drive signal in the HF (high frequency) frequency band (e.g., 3-30 MHz) or the VHF (very high frequency) frequency band (e.g., 30-300 MHz). It is noted that relatively lower frequencies are preferable when low signal loss in associated connecting cables is desirable, and relatively higher frequencies are preferable when a small sensor size is desirable.

The RF sensor drive signal generated by the variable frequency source 104 is supplied to the sensor 102 via the summing and temperature sense circuit 106. In addition to receiving the RF sensor drive signal from the variable frequency source 104, the summing circuit also receives the reflected signal from the sensor 102. The summing and temperature sense circuit 106 sums these two signals together and supplies a standing wave signal 120 representative of the standing wave signal 120 voltage (V) at the driven end 116 of the sensor conductor 112. As FIG. 1 also depicts, the summing and temperature sense circuit 106 additionally supplies a temperature signal 122 that is representative of the temperature of at least a portion of the sensor 102 to the temperature compensation circuit 111.

The standing wave signal 120 from the summing and temperature sense circuit 106 is supplied to the control circuit 108. The control circuit 108 processes the standing wave signal 120, and determines the frequency of the RF sensor drive signal supplied to the sensor 102 relative to the resonant frequency of the transmission line sensor 102. Based on this determination, the control circuit 108 supplies the appropriate frequency control signal to the variable frequency source 104. In particular, as was previously mentioned, the control circuit 108 supplies a frequency control signal that will cause the variable frequency source 104 to supply the RF sensor drive signal at the resonant frequency of the transmission line sensor 102.

The position determination circuit 110 is coupled to the variable frequency source 104, and also receives the RF sensor drive signal supplied thereby. The position determination circuit 110 processes the RF sensor drive signal and, based on the frequency of this signal, supplies a non-compensated signal representative of the position of the moveable dielectric 114 to the temperature compensation circuit 111.

The temperature compensation circuit 111 implements appropriate temperature compensation of the sensor 102 response. In particular, the temperature compensation circuit 111 receives the non-compensated position signal from the position determination circuit 110, and the temperature signal 122 from the summing and temperature sense circuit 106, and supplies a temperature compensated position signal representative of the position of the moveable dielectric 114. It will be appreciated that the temperature compensation circuit 111 may implement position signal temperature compensation using any one of numerous techniques including, for example, a look-up table, analog signal compensation techniques, or digital and/or software compensation techniques using a programmed microcontroller, microprocessor, or other digital computing element. It will additionally be appreciated that the temperature compensation circuit could form part of the position determination circuit 110.

As was previously mentioned, the control circuit 108 senses the frequency of the RF sensor drive signal supplied by the variable frequency source 104, and determines the RF sensor drive signal frequency relative to the resonant frequency of the resonant transmission line sensor 102. In response, the control circuit 108 supplies the control signal to the variable frequency source 104 so that it supplies the RF sensor drive signal at the resonant frequency of the resonant transmission lines sensor 102. More specifically, the control circuit 108 determines whether the RF sensor drive signal is at, below, or above the resonant frequency of the resonant transmission line sensor 102, and supplies the appropriate control signal based on this determination. To do so, the control circuit 108 determines the first derivative of the amplitude of the standing wave signal 120 with respect to frequency.

Figure 7:
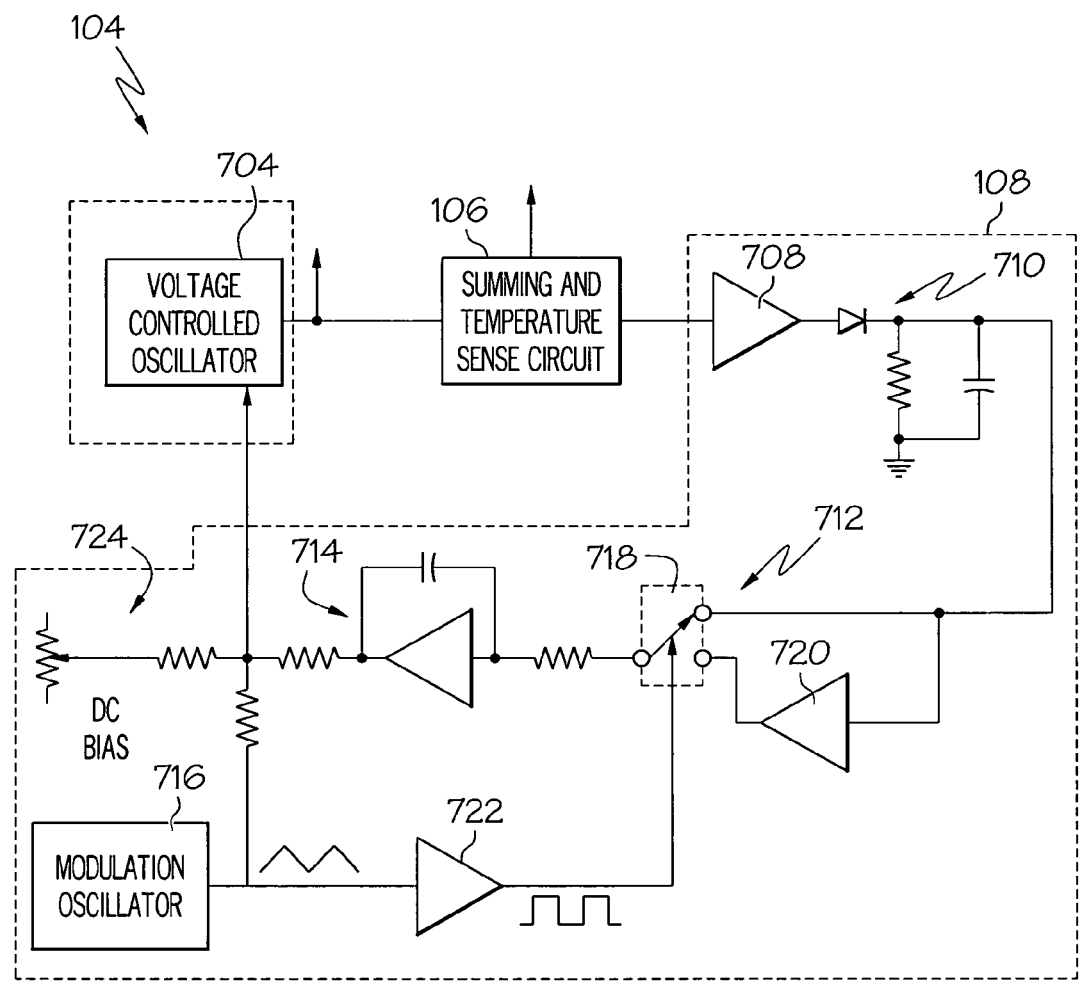
Figure 9A:
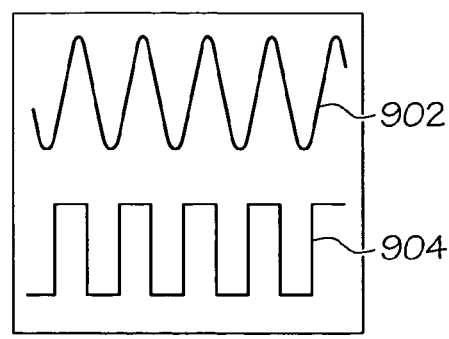
FIGS. 9A and 9B depict signals within the circuit configuration of FIG. 7.
Figure 9B:
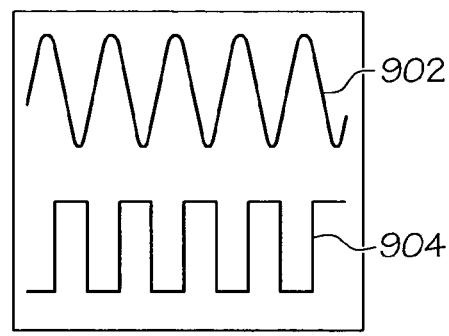

Various circuits and individual component configurations could be used to implement each of the circuit functionalities described above. Moreover, these various circuits and individual component configurations could also be configured to implement the above-described functions in any one of numerous ways. With reference now to FIGS. 7-11, a particular preferred circuit configuration, and the methodologies implemented by this circuit configuration, will now be described. Before doing so, it is noted that a particular preferred implementation of the summing and temperature sense circuit 106 will be described last. As such, it is depicted in FIG. 7 as a functional block.

Turning first to FIG. 7, it is seen that the variable frequency source 104 is implemented as a variable frequency oscillator circuit, and preferably as a voltage-controlled oscillator (VCO) circuit 704. A VCO circuit, as is generally known, generates an AC signal at a frequency that is based on a control signal supplied to the VCO circuit from an external source. In the depicted embodiment, the control signal, as was mentioned above, is supplied to the VCO circuit 704 from the control circuit 108, a particular preferred circuit configuration of which will now be described.

In the depicted embodiment, the control circuit 108 is implemented as a lock-in amplifier circuit, and includes an RF amplifier 708, a rectifier and low-pass filter circuit 710, a synchronous detector circuit 712, an integrator circuit 714, and a modulation oscillator circuit 716. The RF amplifier circuit 708 receives and amplifies the standing wave signal 120 supplied from the summing and temperature sense circuit 106. The amplified standing wave signal 120 is supplied to the rectifier and low-pass filter circuit 710, which rectifies and smoothes the standing wave signal 120, and supplies the rectified standing wave signal 120 to the synchronous detector circuit 712.

The synchronous detector circuit 712, at least in the depicted embodiment, includes an analog switch 718, an inverter 720, and a threshold comparator circuit 722. The analog switch 718 is controlled by a square wave signal supplied from the comparator circuit 722. The comparator circuit 722 is coupled to the modulation oscillator circuit 716, which generates and supplies a modulation signal, preferably in the audio frequency range. The comparator circuit 722, in response to the modulation signal, supplies a switch control signal at the same frequency as the modulation signal frequency. Thus, the position of the analog switch 718 is switched at the modulation signal frequency, and supplies a phase-detected signal to the integrator circuit 714.

The integrator circuit 714 receives the phase-detected signal from the synchronous detector circuit 712, and integrates this signal to produce a phase-detected control signal. The phase-detected control signal is summed with the modulation signal supplied from the modulation oscillator circuit 716, to supply the frequency control signal to the VCO circuit 704. As is also depicted in FIG. 7, the control circuit 108 may additionally include a bias voltage supply circuit 724. The bias voltage supply circuit, if included, supplies a DC bias voltage, which is additionally summed with the phase-detected control signal and the modulation signal, to produce the frequency control signal that is supplied to the VCO circuit 704.

It was previously mentioned that the control circuit 108 determines the first derivative of the amplitude of the standing wave signal 120 with respect to RF sensor drive signal frequency, and that this determination is used to supply the appropriate frequency control signal to the variable frequency source 104. This is accomplished by frequency modulating the RF sensor drive signal supplied by the variable frequency source 104, and synchronously detecting the amplitude of the standing wave signal 120 supplied from the summing circuit. In the above-described circuit implementation, the modulation signal supplied by modulation oscillator circuit 716 is used to frequency modulate the RF sensor drive signal. Because the frequency modulation alternates between increasing and decreasing the RF sensor drive signal frequency, the standing wave signal 120 from the resonant transmission line sensor 102 is not only similarly frequency modulated, it is also amplitude modulated.

The synchronous detector circuit 712, in combination with the RF amplifier 708, and the low-pass filter circuit 710, synchronously detects the standing wave signal 120 amplitude in phase with the frequency modulation, to produce the phase-detected signal. If the phase-detected signal is in phase with the frequency modulation, which means the amplitude and frequency modulation of the standing wave signal 120 are in phase, then the RF sensor drive signal frequency is greater than the resonant frequency of the resonant transmission sensor 102 (e.g., the first derivative of the amplitude of the standing wave signal 120 with respect to frequency is positive). This instance is illustrated in FIG. 10A, which shows the phase-detected signal 1002 in phase with the switch control signal 1004 supplied from the comparator circuit 722. Conversely, if the phase-detected signal is 180-degrees out of phase with the frequency modulation, which means the amplitude and frequency modulation of the standing wave signal 120 are 180-degrees out of phase, then the RF sensor drive signal frequency is less than the resonant frequency of the resonant transmission sensor 102 (e.g., the first derivative of the amplitude of the standing wave signal 120 with respect to frequency is negative). This instance is illustrated in FIG. 10B, which shows the phase-detected signal 1002 180-degrees out of phase with the switch control signal 1004.

It should be understood that it is the polarity of the phase-detected control signal that is output by the integrator circuit 714 that indicates whether the RF sensor drive signal frequency is greater than or less than the resonant frequency of the resonant transmission line sensor 102. Specifically, if the phase-detected control signal is a positive voltage, then the RF sensor drive signal frequency is greater than the resonant frequency of the resonant transmission line sensor 102. Conversely, if the phase-detected control signal is a negative voltage, then the RF sensor drive signal frequency is less than the resonant frequency of the resonant transmission line sensor 102. In either case, the phase-detected control signal is added to the modulation signal to generate an appropriate frequency control signal that is then supplied to the variable frequency source 104, to bring the RF sensor drive signal frequency to the resonant frequency of the resonant transmission line sensor 102.

Before describing a specific implementation of the position determination circuit 110, a brief description of the operation of the specific circuit implementations of the variable frequency source 104 and the control circuit 108 described above will first be described. In doing so, reference should be made to FIG. 10, which depicts a portion of the standing wave response 1002, in the frequency domain, of the resonant transmission line sensor 102 near a resonant frequency 1004.

Figure 10:
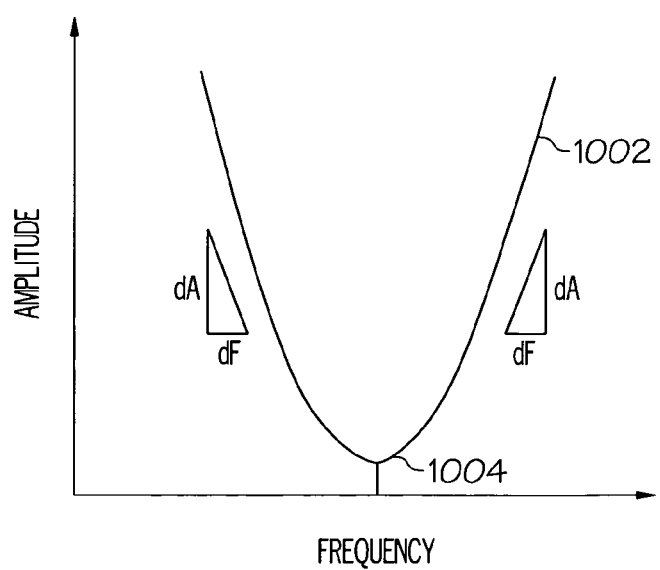
FIG. 10 is a portion of an exemplary resonant transmission line standing wave response in the frequency domain near a resonance node.

As shown in FIG. 10, if the control circuit 108 determines that the frequency of the RF sensor drive signal is below the resonant frequency 1004, the synchronous detector circuit 712, integrator circuit 714, and modulation oscillator 716 produce a frequency control signal that causes the VCO circuit 704 to increase the frequency of the RF sensor drive signal to the resonant frequency 1004. Conversely, if the control circuit 108 determines that the frequency of the RF sensor drive signal is above the resonant frequency 1004, the synchronous detector circuit 712, integrator circuit 714, and modulation oscillator 716 produce a frequency control signal that causes the VCO circuit 704 to decrease the frequency of the RF sensor drive signal to the resonant frequency 1004.

Figure 8:
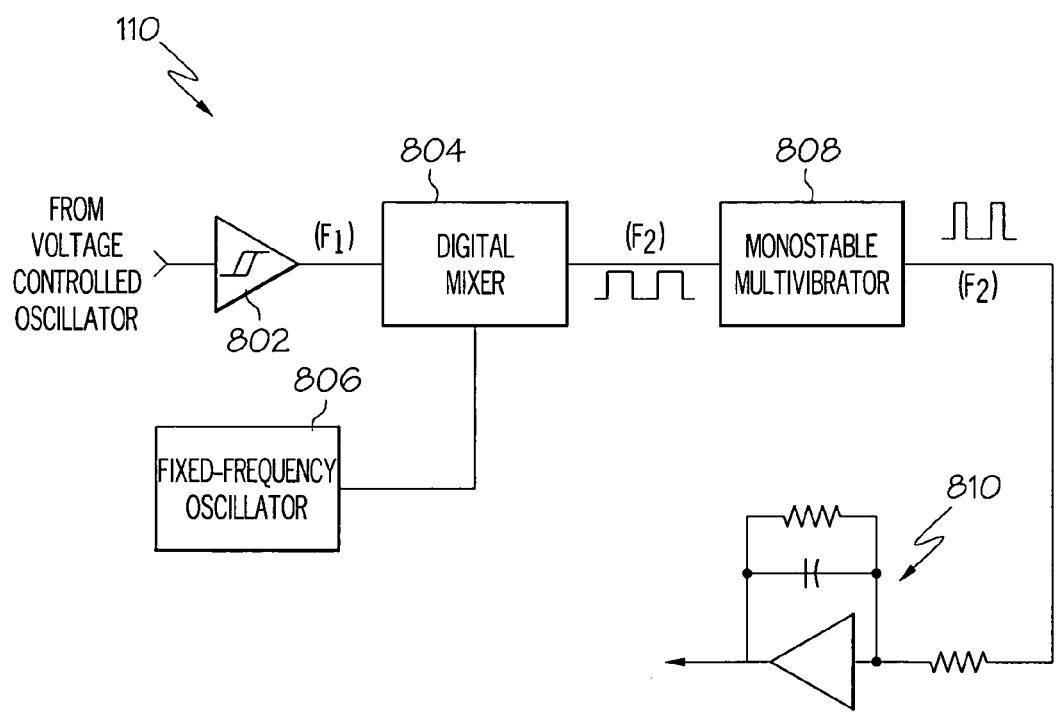
FIGS. 7 and 8 are each functional block diagrams of exemplary circuit configurations that may be used to implement the system of FIG. 1.

Turning now to a description of the position determination circuit, in a particular preferred embodiment, the position determination circuit 110 is implemented as a frequency-to-voltage converter circuit. As is generally known, a frequency-to-voltage converter circuit converts an AC signal to a DC signal having a voltage magnitude that is proportional to the frequency of the AC signal. Although various circuit configurations could be used to implement this particular preferred function, in the particular preferred implementation, which is shown in FIG. 8, the position determination circuit 110 includes a Schmitt trigger circuit 802, a digital mixer circuit 804, a fixed-frequency oscillator circuit 806, a monostable multivibrator circuit 808, and a signal averaging circuit 810.

The Schmitt trigger circuit 802 receives the RF sensor drive signal from the VCO circuit 704, and converts it to a square wave signal having a frequency ($F_1$) that matches the RF sensor drive signal frequency. The digital mixer 804 receives the square wave signal and a fixed-frequency signal supplied by the fixed-frequency oscillator 806, and heterodynes (or mixes) the two signals to convert the square wave signal to a heterodyned signal having a lower frequency ($F_2$). The heterodyned signal is then supplied to the monostable vibrator circuit 808, which supplies a fixed pulse-width signal at the frequency of the heterodyned signal ($F_2$). The signal averaging circuit 801 receives and averages the fixed pulse-width signal, and supplies a DC position signal having a voltage magnitude that is proportional to the heterodyned signal frequency ($F_2$).

Figure 11:
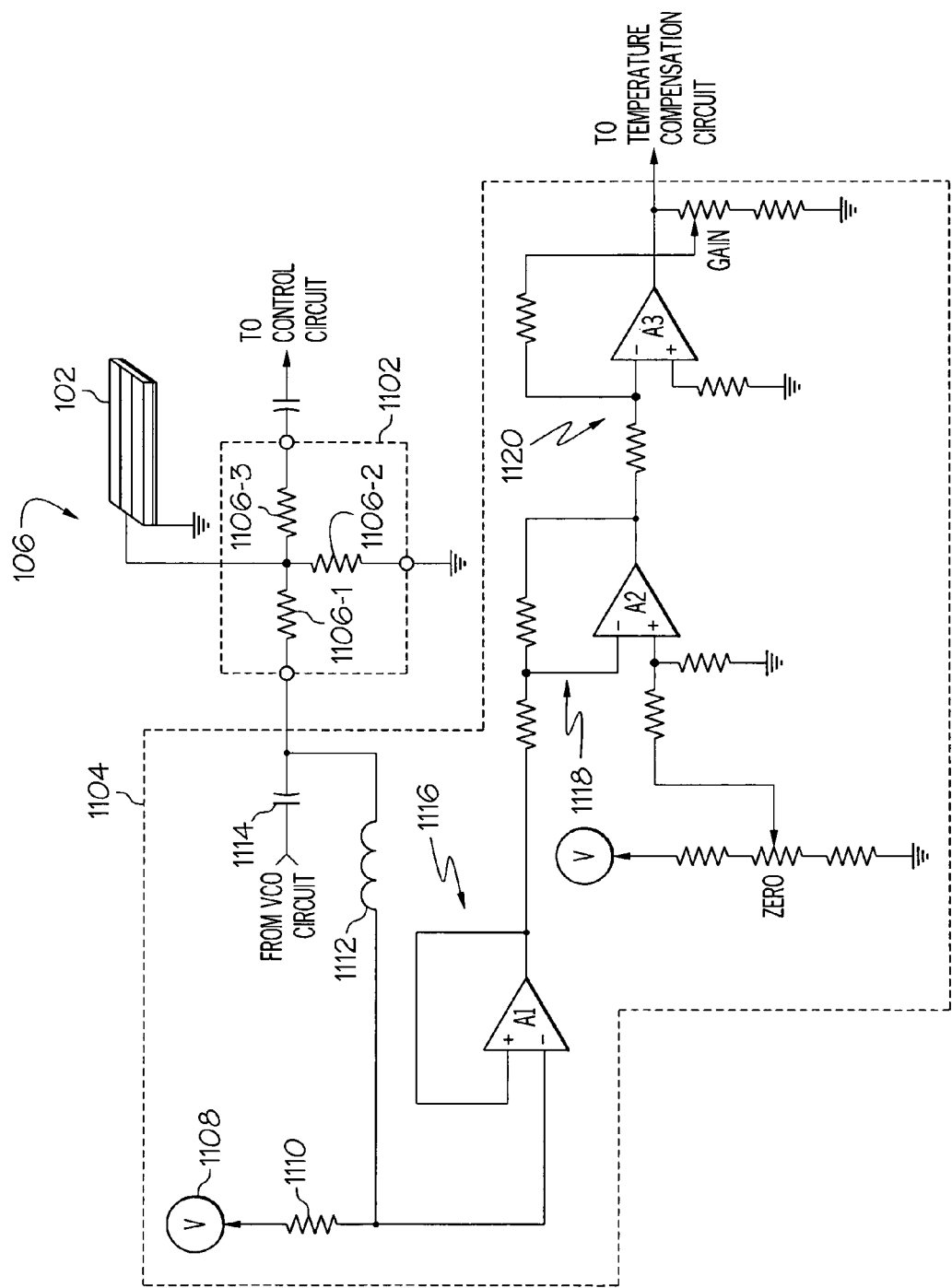
FIG. 11 is a schematic diagram of an exemplary circuit configuration that may be used to implement a portion of the system of FIG. 1.

Turning now to FIG. 11, a detailed description of the summing and temperature sense circuit 106 will be described. The summing and temperature sense circuit 106 includes a resistance network 1102 and a temperature signal conditioning circuit 1104. The resistance network 1102 implements both a summing function and a temperature sensing function and, at least in the depicted embodiment, is configured as a resistor "T" network. It will be appreciated, however, that it could be configured in any one of numerous other three-port summing circuit configurations. The resistance network 1102 sums the RF sensor drive signal from the VCO circuit 104 and the signal reflected in the transmission line sensor 102, producing the previously-mentioned standing wave signal 120. In a preferred embodiment, the resistance network 1102 is collocated with the resonant transmission line sensor 102. This is done to make the response of the sensor 102 independent of the length of the cables interconnecting the sensor 102 to the circuitry, and so that the temperature sensing function of the resistance network 1102, which will now be described, senses a temperature that is more closely representative of that of the transmission line sensor 102.

The resistance network 1102 includes three resistance elements 1106, a first resistance element 1106-1, a second resistance element 1106-2, and a third resistance element 1106-3. Each resistance element 1106 may be implemented using individual resistance elements or various series and/or parallel combinations of individual resistance elements to attain the desired individual resistance values. No matter how each resistance element 1106 is implemented, the first and second resistance elements 1106-1 and 1106-2 are preferably constructed, at least in part, of materials having a known temperature coefficient of resistance. Various materials, such as platinum, may be used, but in a particular implementation, the first and second resistance elements 1106-1 and 1106-2 are constructed using nichrome. It may thus be appreciated that if the temperature of the resistance network 1102 increases, the resistances of the first and second resistance elements 1106-1 and 1106-2 concomitantly increase.

In order to supply both the standing wave signal 120 and the temperature signal 122, the resistance network 1102 receives both the RF sensor drive signal from the VCO circuit 104, and a DC sensor drive signal from the temperature signal conditioning circuit 1104. The DC sensor drive signal is derived from a voltage source 1108 and a resistance element 1110, which together approximate the function of a current source, and are electrically isolated from the RF sensor drive signal via an inductor 1112 and a capacitor 1114. It will be appreciated that numerous other circuit configurations that approximate a current source could be used to supply the DC sensor drive signal. Nonetheless, in the depicted embodiment, the resistance element 1110 has a resistance value that is significantly greater than the sum of the resistance values of the first and second resistance elements 1106-1 and 1106-2. As such, the voltage source 1108 and resistance element 1110 generate a voltage that proportional to the sum of the first and second resistance elements 1106-1 and 1106-2. This is supplied to the remainder of the temperature signal conditioning circuit 1104, which, at least in the depicted embodiment, includes a zero-gain buffer amplifier circuit 1116, a zero-setting (or offset-setting) amplifier circuit 1118, and a gain-setting amplifier circuit 1120. Together, these amplifier circuits supply an appropriately conditioned and amplified temperature signal 122 to the temperature compensation circuit 111.

It is noted that the resistance change of the first and second resistors 1106-1 and 1106-2 with temperature is preferably relatively small, so that attenuation of the RF sensor drive signal is relatively small as a function of temperature, but sufficiently large to result in a measurable temperature signal. Thus, if needed or desired, the first and second resistance elements 1106-1 and 1106-2 can be implemented using series and/or parallel connected resistances of various combinations of materials having different temperature coefficients of resistance to obtain a particularly desirable temperature coefficient value.

Figure 12:
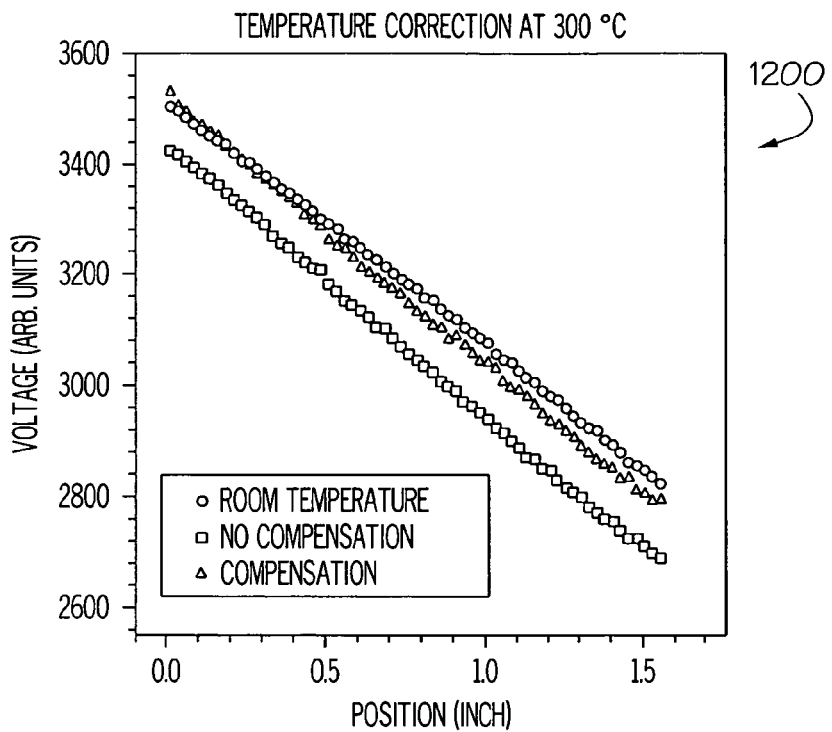
FIGS. 12 and 13 are graphs depicting the response of the system of FIG. 1 both with and without temperature compensation according to exemplary embodiments of the invention.
Figure 13:
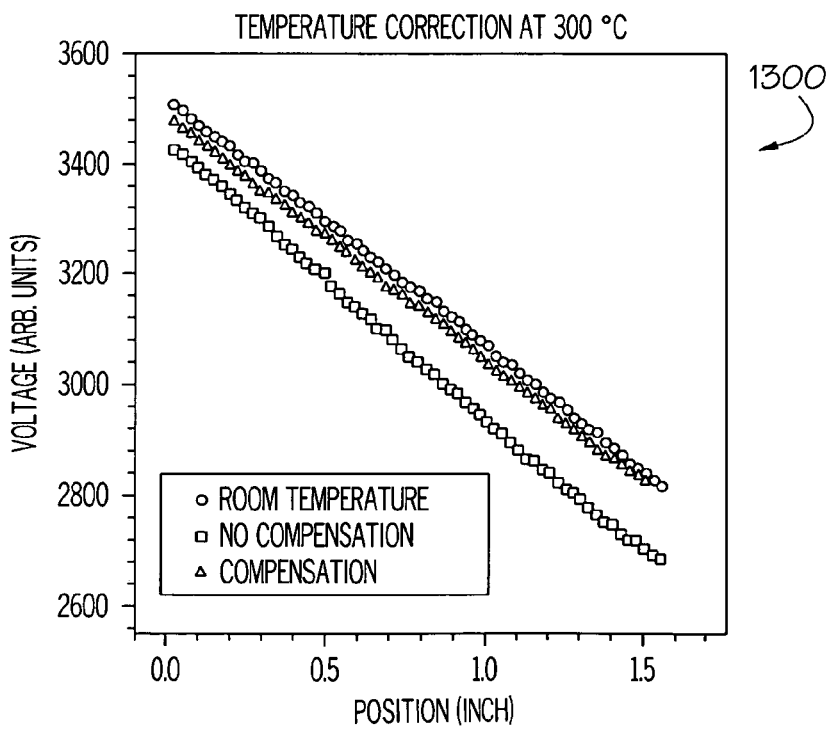

The above-described temperature measurement technique effectively compensates the sensor for temperature effects. Indeed, data illustrating the effectiveness thereof are graphically depicted in FIGS. 12 and 13. The depicted graphs 1300, 1400 show the temperature compensation for two different gain and offset settings of the temperature signal conditioning circuit 1104, using a microcontroller with a look-up table function to implement the temperature compensation function. As both of these graphs 1200, 1300 depict, the temperature measurement and compensation technique significantly reduces the temperature error in the sensor signal.

Figure 14:
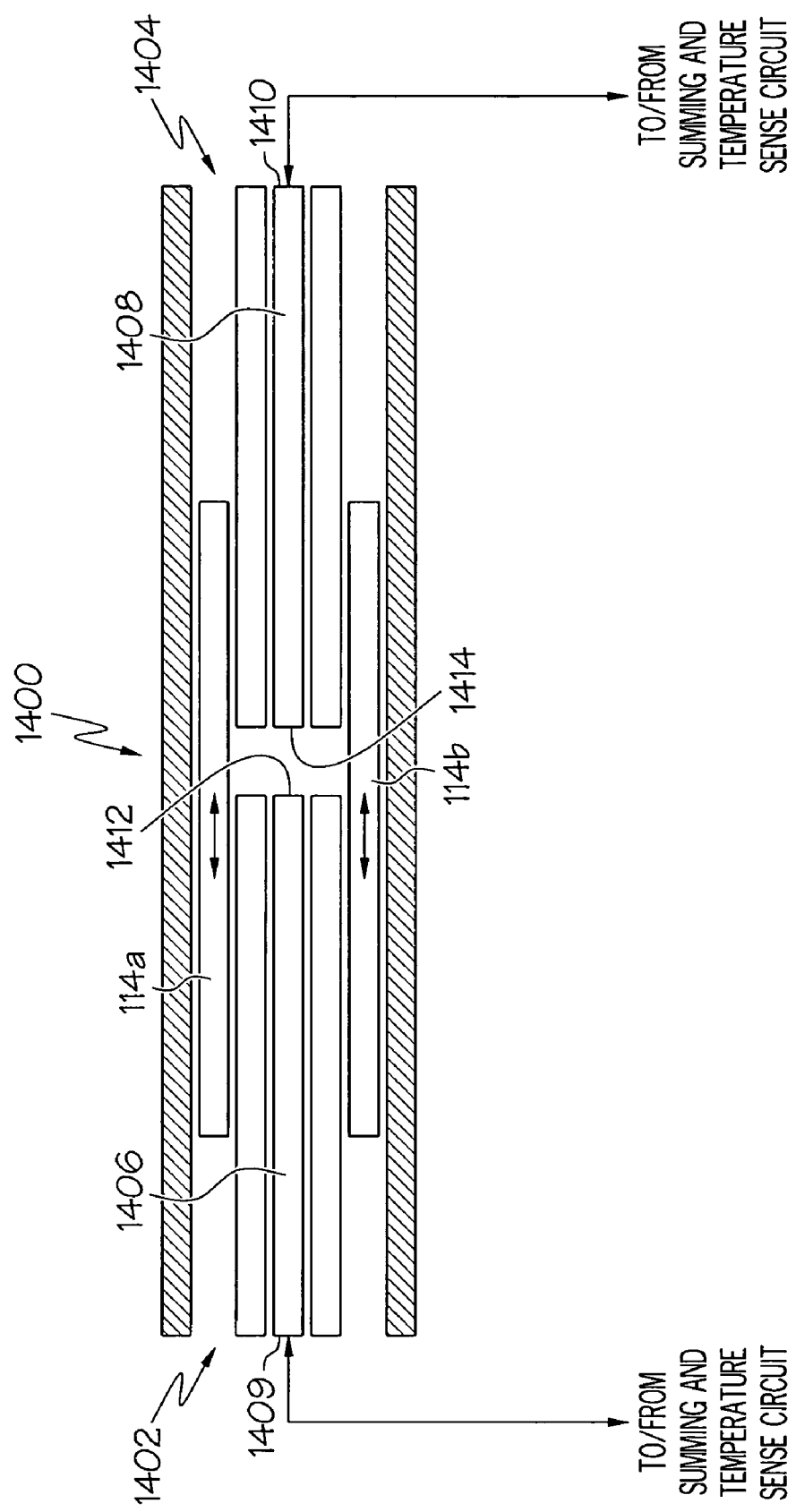
FIG. 14 is a simplified schematic representation of an exemplary physical implementation of an embedded stripline resonant transmission line differential sensor.

In addition to the above-described implementation, the sensor 102 can also be implemented in a differential sensor configuration. An exemplary embodiment of a differential sensor 1400 is depicted in FIG. 14, and will reference thereto will now be described.

The differential sensor 1400 is configured similar to the non-differential sensor 102 depicted in FIG. 6, except that it includes two sections, a sensor section 1402 and a reference section 1404, that share a common moveable dielectric 114. Each section 1402, 1404 includes an individual conductor. Thus, the sensor section 1402 includes a sensor conductor 1406, and the reference section includes a reference conductor 1408. As with the non-differential sensor, the sensor conductor 1406 and reference conductor 1408 are each preferably embedded in a fixed dielectric 602, though the differential sensor 1400 could be implemented without the fixed dielectric 602. The sensor 1406 and reference 1408 conductors each include a driven end 1409 and 1410, respectively, and a terminal end 1412 and 1414, respectively. The driven ends 1409, 1410 are each coupled to receive a RF sensor drive signal, and each conductor terminal end 1412, 1414 reflects the RF sensor drive signal back toward its respective driven end 1409, 1410, producing a standing wave signal 120 voltage at the respective driven end 1409, 1410. The moveable dielectric 114, at least in the depicted embodiment, is implemented as two separate moveable dielectrics 114a, 114b, that are disposed on both sides of the sensor 1406 and reference 1408 conductors, though it will be appreciated that it could be implemented as a single moveable dielectric.

With the differential sensor 1400 just described, each of the sensor sections 1402, 1404 is coupled to similarly configured circuitry. Thus, as shown in FIG. 14, the sensor section 1402 and reference section 1404 are each coupled to substantially identical, but non-illustrated, summing and temperature sense circuits 106 which are each in turn coupled to substantially identical, and non-illustrated, variable frequency sources 104, control circuits 108, position determination circuits 110, and temperature compensation circuits 111. The summing and temperature sense circuits 106, variable frequency sources 104, control circuits 108, position determination circuits 110, and temperature compensation circuits 111 coupled to each sensor section 1402, 1404 are substantially identical as those previously described, and will therefore not be further discussed.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A position sensing system, comprising:
   a variable frequency signal source coupled to receive a frequency control signal and operable, in response thereto, to supply a radio frequency sensor drive signal at a frequency;
   a transmission line sensor having one or more resonant frequencies, the transmission line sensor including a sensor conductor and a moveable dielectric at least partially surrounding the sensor conductor, the sensor conductor having a driven end coupled to receive the sensor drive signal and a terminal end configured to reflect the sensor drive signal to thereby supply a reflected signal to the driven end, the moveable dielectric configured to receive a drive force and, upon receipt thereof, to move the dielectric to a position and thereby vary the one or more resonant frequencies of the transmission sensor; and
   a summing and temperature sense circuit including one or more circuit elements having an electrical characteristic that varies with temperature, the summing and temperature sense circuit coupled to receive the radio frequency sensor drive signal and the reflected signal and operable, in response thereto, to supply a standing wave signal having an amplitude that varies with the one or more resonant frequencies of the transmission line sensor, the summing and temperature sense circuit further coupled to receive a direct current sensor excitation signal and operable, in response thereto, to supply a temperature signal representative of transmission line senor temperature.

2. The system of claim 1, further comprising:
   a direct current power source operable to supply the direct current sensor excitation signal to the summing and temperature sense circuit.

3. The system of claim 2, further comprising:
   an inductance circuit coupled between the direct current power source and the summing and temperature sense circuit.

4. The system of claim 2, wherein the summing and temperature sense circuit comprises:
   a first resistor coupled between the sensor conductor, the variable frequency signal source, and the direct current power source, the first resistor having a resistance that varies with temperature;
   a second resistor coupled between the sensor conductor and a circuit common, the second resistor having a resistance that varies with temperature; and
   a third resistor coupled to the sensor conductor.

5. The system of claim 4, wherein the summing and temperature sense circuit further comprises:
   one or more amplifier circuits coupled to the first resistor to receive the temperature signal therefrom and operable, upon receipt thereof, to supply an amplified temperature signal.

6. The system of claim 1, further comprising:
   a control circuit coupled to receive the standing wave signal and operable, in response thereto, to (i) determine the radio frequency sensor drive signal frequency relative to at least one of the transmission line sensor resonant frequencies and (ii) supply the frequency control signal to the variable frequency source, to thereby adjust the radio frequency sensor drive signal frequency to substantially match at least one of the transmission line sensor resonant frequencies.

7. The system of claim 6, further comprising:
   a position determination circuit coupled to receive the adjusted radio frequency sensor drive signal and operable, in response thereto, to determine the position of the moveable dielectric relative to the sensor conductor and supply a position signal representative thereof.

8. The system of claim 7, wherein the position determination circuit comprises:
   a frequency to voltage converter circuit coupled to receive the adjusted radio frequency sensor drive signal and operable, in response thereto, to supply a direct current signal having a voltage magnitude proportional to the position of the moveable dielectric.

9. The system of claim 7, further comprising:
   a temperature compensation circuit coupled to receive the temperature signal and the position signal representative of the moveable dielectric relative to the reference conductor and operable, in response thereto, to supply a temperature compensated signal representative of the position of the moveable dielectric relative to the sensor conductor.

10. The system of claim 6, wherein the control circuit comprises a lock-in amplifier circuit.

11. The system of claim 6, wherein the control circuit determines the radio frequency sensor drive signal frequency relative to at least one of the transmission line sensor resonant frequencies by determining a derivative of the standing wave signal amplitude with respect to the radio frequency sensor drive signal frequency.

12. The system of claim 1, wherein the variable frequency signal source comprises a voltage controlled oscillator circuit.

13. The system of claim 1, wherein the transmission line sensor is configured as an embedded stripline resonant transmission line.

14. The system of claim 1, further comprising:
   a fixed-frequency signal source operable to supply a fixed-frequency modulation signal,
   wherein the variable frequency source is further coupled to receive the fixed-frequency modulation signal and is further operable, in response thereto, to frequency modulate the radio frequency sensor drive signal based on the fixed-frequency modulation signal.

15. The system of claim 1, wherein the system further comprises:
   a reference variable frequency signal source coupled to receive a reference frequency control signal and operable, in response thereto, to supply a reference radio frequency sensor drive signal;

a reference transmission line sensor having one or more resonant frequencies, the reference transmission line sensor including a reference conductor and the moveable dielectric at least partially surrounding the reference conductor, the reference conductor having a driven end coupled to receive the reference radio frequency sensor drive signal and a terminal end configured to reflect the reference radio frequency sensor drive signal to thereby supply a reference reflected signal to the driven end, the moveable dielectric configured, upon receipt of the drive force, to move to a position and thereby vary the one or more resonant frequencies of the reference transmission sensor;

a reference summing and temperature sense circuit including one or more circuit elements having an electrical characteristic that varies with temperature, the summing and temperature sense circuit coupled to receive the reference radio frequency sensor drive signal and the reflected signal and operable, in response thereto, to supply a standing wave signal having an amplitude that varies with the one or more resonant frequencies of the reference transmission line sensor, the reference summing and temperature sense circuit further coupled to receive a reference direct current sensor excitation signal and operable, in response thereto, to supply a reference temperature signal representative of reference summing and temperature sense circuit temperature.

16. The system of claim 15, further comprising:

a reference control circuit coupled to receive the reference standing wave signal and operable, in response thereto, to (i) determine the reference radio frequency sensor drive signal frequency relative to at least one of the reference transmission line sensor resonant frequencies and (ii) supply the reference frequency control signal to the reference variable frequency source, to thereby adjust the reference radio frequency sensor drive signal frequency to substantially match at least one of the reference transmission line sensor resonant frequencies; and a reference position determination circuit coupled to receive the adjusted reference radio frequency sensor drive signal and operable, in response thereto, to determine the position of the moveable dielectric relative to the reference conductor and supply a position signal representative thereof.

17. A position sensing system, comprising:

a variable frequency signal source coupled to receive a frequency control signal and operable, in response thereto, to supply an radio frequency sensor drive signal at a frequency;

a direct current power source operable to supply a direct current sensor excitation signal;

a transmission line sensor having one or more resonant frequencies, the transmission line sensor including a sensor conductor and a moveable dielectric at least partially surrounding the sensor conductor, the sensor conductor having a driven end coupled to receive the radio frequency sensor drive signal and a terminal end configured to reflect the radio frequency sensor drive signal to thereby supply a reflected signal to the driven end, the moveable dielectric configured to receive a drive force and, upon receipt thereof, to move the dielectric to a position and thereby vary the one or more resonant frequencies of the transmission sensor; and a summing and temperature sense circuit including one or more circuit elements having an electrical characteristic that varies with temperature, the summing and temperature sense circuit coupled to receive the radio frequency sensor drive signal and the reflected signal and operable, in response thereto, to supply a standing wave signal having an amplitude that varies with the one or more resonant frequencies of the transmission line sensor, the summing and temperature sense circuit further coupled to receive the direct current sensor excitation signal and operable, in response thereto, to supply a temperature signal representative of transmission line sensor temperature.

18. The system of claim 17, further comprising:

an inductance circuit coupled between the direct current power source and the summing and temperature sense circuit; and one or more amplifier circuits coupled to the inductance circuit element and configured to receive the temperature signal therefrom.

19. The system of claim 17, wherein the summing and temperature sense circuit comprises:

a first resistor coupled between the sensor conductor, the variable frequency signal source, and the direct current power source, the first resistor having a resistance that varies with temperature;

a second resistor coupled between the sensor conductor and a circuit common, the second resistor having a resistance that varies with temperature; and a third resistor coupled to the sensor conductor.

20. The system of claim 17, further comprising:

a control circuit coupled to receive the standing wave signal and operable, in response thereto, to (i) determine the radio frequency sensor drive signal frequency relative to at least one of the transmission line sensor resonant frequencies and (ii) supply the frequency control signal to the variable frequency source, to thereby adjust the radio frequency sensor drive signal frequency to substantially match at least one of the transmission line sensor resonant frequencies; and a position determination circuit coupled to receive the adjusted radio frequency sensor drive signal and operable, in response thereto, to determine the position of the moveable dielectric relative to the sensor conductor and supply a position signal representative thereof.

21. The system of claim 20, further comprising:

a temperature compensation circuit coupled to receive the temperature signal and the position signal representative of the moveable dielectric relative to the reference conductor and operable, in response thereto, to supply a temperature compensated position signal representative of the position of the moveable dielectric relative to the sensor conductor.

22. A position sensing system, comprising:

a variable frequency signal source coupled to receive a frequency control signal and operable, in response thereto, to supply an radio frequency sensor drive signal at a frequency;

a direct current power source operable to supply a direct current sensor excitation signal;

a transmission line sensor having one or more resonant frequencies, the transmission line sensor including a sensor conductor and a moveable dielectric at least partially surrounding the sensor conductor, the sensor conductor having a driving end coupled to receive the radio frequency sensor drive signal and a terminal end configured to reflect the radio frequency sensor drive signal to thereby supply a reflected signal to the driven end, the moveable dielectric configured to receive a drive force and, upon receipt thereof, to move the dielectric to a position and thereby vary the one or more resonant frequencies of the transmission sensor;

a summing and temperature sense circuit including one or more circuit elements having an electrical characteristic that varies with temperature, the summing and temperature sense circuit coupled to receive the radio frequency sensor drive signal and the reflected signal and operable, in response thereto, to supply a standing wave signal having an amplitude that varies with the one or more resonant frequencies of the transmission line sensor, the summing and temperature sense circuit further coupled to receive the direct current sensor excitation signal and operable, in response thereto, to supply a temperature signal representative of transmission line sensor temperature;

a control circuit coupled to receive the standing wave signal and operable, in response thereto, to (i) determine the radio frequency sensor drive signal frequency relative to at least one of the transmission line sensor resonant frequencies and (ii) supply the frequency control signal to the variable frequency source, to thereby adjust the radio frequency sensor drive signal frequency to substantially match at least one of the transmission line sensor resonant frequencies;

a position determination circuit coupled to receive the adjusted radio frequency sensor drive signal and operable, in response thereto, to determine the position of the moveable dielectric relative to the sensor conductor and supply a position signal representative thereof; and a temperature compensation circuit coupled to receive the temperature signal and the position signal representative of the moveable dielectric relative to the reference conductor and operable, in response thereto, to supply a temperature compensated position signal representative of the position of the moveable dielectric relative to the sensor conductor.

* * * * *